US012600342B2

(12) United States Patent
Ferri et al.

(10) Patent No.: US 12,600,342 B2
(45) Date of Patent: Apr. 14, 2026

(54) METHOD FOR CONTROLLING A HYBRID POWERTRAIN AND HYBRID POWERTRAIN OPERATING ACCORDING TO SUCH A METHOD

(71) Applicant: DAYCO EUROPE S.R.L., Chieti (IT)

(72) Inventors: Gaetano Ferri, Pescara (IT); Mario Pennazza, Pescara (IT); Riccardo Bucci, Turin (IT); Andrea Tonoli, Turin (IT); Nicola Amati, Turin (IT); Angelo Bonfitto, Turin (IT); Shailesh Hegde, Turin (IT); Enrico Zenerino, Turin (IT); Renato Galluzzi, Turin (IT)

(73) Assignee: MUVIQ S.R.L., Ivrea (IT)

( * ) Notice: Subject to any disclaimer, the term of this patent is extended or adjusted under 35 U.S.C. 154(b) by 161 days.

(21) Appl. No.: 18/549,642

(22) PCT Filed: Mar. 10, 2022

(86) PCT No.: PCT/IB2022/052160
§ 371 (c)(1),
(2) Date: Sep. 8, 2023

(87) PCT Pub. No.: WO2022/190032
PCT Pub. Date: Sep. 15, 2022

(65) Prior Publication Data
US 2024/0157930 A1 May 16, 2024

(30) Foreign Application Priority Data
Mar. 10, 2021 (IT) ........................ 102021000005603

(51) Int. Cl.
*B60W 20/11* (2016.01)
*B60W 10/06* (2006.01)
(Continued)

(52) U.S. Cl.
CPC ............ *B60W 20/11* (2016.01); *B60W 10/06* (2013.01); *B60W 10/08* (2013.01); *B60W 10/10* (2013.01);
(Continued)

(58) Field of Classification Search
CPC ...... B60W 20/11; B60W 10/06; B60W 10/08; B60W 10/10; B60W 20/16;
(Continued)

(56) References Cited

U.S. PATENT DOCUMENTS

2015/0051776 A1 2/2015 Gotoh et al.

FOREIGN PATENT DOCUMENTS

| CN | 108657158 B | 10/2018 |
| EP | 0759370 A2 | 2/1997 |
| EP | 0759370 B1 * | 10/2001 |

OTHER PUBLICATIONS

PCT/IB2022/052160, International Search Report and Written Opinion, Jun. 9, 2022 (13 pages).
(Continued)

*Primary Examiner* — Brian P Sweeney
(74) *Attorney, Agent, or Firm* — FisherBroyles, LLP; Susan M. Oiler

(57) ABSTRACT
A control method of a hybrid powertrain for a vehicle having an internal combustion engine, an electrical machine connected to a crankshaft of the internal combustion engine via a transmission and a control unit are disclosed. The method includes acquisitioning first data representative of the efficiency of the internal combustion engine, of the electrical machine and of the transmission, acquisitioning second data representative of operating conditions of the vehicle, and processing the data, which includes calculating a distribution of the torque between the internal combustion engine and the electrical machine.

13 Claims, 4 Drawing Sheets

(51) Int. Cl.

| | |
|---|---|
| *B60W 10/08* | (2006.01) |
| *B60W 10/10* | (2012.01) |
| *B60W 20/16* | (2016.01) |

(52) U.S. Cl.
CPC ..... *B60W 20/16* (2016.01); *B60W 2510/0657* (2013.01); *B60W 2510/083* (2013.01); *B60W 2510/10* (2013.01); *B60W 2510/244* (2013.01)

(58) Field of Classification Search
CPC ... B60W 2510/0657; B60W 2510/083; B60W 2510/10; B60W 2510/244; B60W 2050/0039; B60W 2050/0041; Y02T 10/62; B60K 6/485; B60K 6/48
See application file for complete search history.

(56) References Cited

OTHER PUBLICATIONS

European Office Action, Application No. 22715171.9, Oct. 1, 2024, 4 pages.
European Intention to Grant, Application No. 22715171.9, Jul. 7, 2025, 27 pages.

* cited by examiner

M3 start   20 map loading
M1, M2, M3   21 data
acquisition   22

23   Treq > 0 ?   N   Recuperation   25

Y

24   Boost 26   stop?

N

Y stop   27

METHOD FOR CONTROLLING A HYBRID POWERTRAIN AND HYBRID POWERTRAIN OPERATING ACCORDING TO SUCH A METHOD

CROSS-REFERENCE TO RELATED APPLICATIONS

The present invention is filed under 35 U.S.C. § 371 as the U.S. National Phase of International Patent Application No. PCT/IB2022/052160, filed Mar. 10, 2022, which designated the United States and which claims the benefit of Italian patent application no. 102021000005603, filed Mar. 10, 2021, the entire disclosure of which is incorporated herein by reference.

TECHNICAL FIELD

The present invention concerns a method for controlling a hybrid powertrain and a hybrid powertrain operating according to such a method.

STATE OF THE ART

Hybrid powertrains are known comprising an internal combustion engine (below "engine" for brevity) and at least one electrical machine designed to operate as an electric motor or generator according to the operating conditions.

In particular, the electrical machine can operate as a supplementary motor in combination with the internal combustion engine (so-called boost condition), or as a generator. In this second case, the electrical machine can operate as a regenerative brake (so-called recovery condition).

According to a configuration known as "P0", the electrical machine is arranged on a front side of the engine, namely on the side opposite the transmission, and is connected to the engine via an accessory drive comprising a pulley connected to the crankshaft, a pulley connected to the shaft of the electrical machine and, optionally, one or more pulleys for driving other accessories such as, for example, the compressor of the conditioning system. The accessory drive further comprises a belt for transmission of the motion between the above-mentioned pulleys and a tensioner designed to ensure a correct minimum tension level of the belt and avoid slipping between the belt and the pulleys.

According to another configuration known as "P2", the electrical machine is arranged downstream of the engine and can be selectively connected to the crankshaft by means of a clutch. In the case in which the electrical machine is in a position not coaxial with the crankshaft (so-called off-axis solution), the use of a transmission is still necessary, typically a belt and/or chain transmission, for connecting the electrical machine to the internal combustion engine and/or to the transmission.

The powertrains of the type briefly described comprise a control unit that receives in input a plurality of signals representative of the vehicle operating conditions and the power requirement, and controls the power supply of the internal combustion engine and the electrical machine so as to modulate the torque provided by the internal combustion engine and/or by the electrical machine according to a programmed strategy.

Various strategies are known for energy management in hybrid powertrains, which can be model-based, the models being of numerical or analytical type, or rule-based.

Of the analytical model-based methods, the Equivalent Consumption Minimization Strategy or ECMS can be cited, which consists in minimization of the equivalent instantaneous consumption defined by the fuel actually consumed by the internal combustion engine and by the consumption of "virtual" fuel equivalent to the electrical energy consumed by the electrical machine.

The rule-based methods include the charge-depleting strategy and fuzzy logics.

SUBJECT OF THE INVENTION

The object of the present invention is to perfect the known control methods in order to improve fuel saving and reduce emissions.

The above-mentioned object is achieved by a control method for controlling a hybrid powertrain for a vehicle that has an internal combustion engine, an electrical machine connected to a crankshaft of the internal combustion engine via a transmission, and a control unit. The method includes acquiring first data representative of an efficiency of the internal combustion engine ($M1$), representative of an efficiency of the electrical machine ($M2$), and representative of an efficiency of the transmission ($M3$), acquiring second data representative of vehicle operating conditions, and processing the first data and the second data. Processing the data includes calculating a distribution of torque between the internal combustion engine and the electrical machine.

The present invention also concerns a powertrain for a hybrid vehicle that includes an internal combustion engine, an electrical machine connected to a crankshaft of the internal combustion engine via a transmission, and a control unit. The control unit is operating/implementing the control method described herein.

BRIEF DESCRIPTION OF THE DRAWINGS

For a better understanding of the present invention, a preferred embodiment is described below, by way of non-limiting example and with reference to the attached drawings, in which.

DETAILED DESCRIPTION OF PREFERRED EMBODIMENT OF THE INVENTION

Figures 1, 2:
FIG. 1 is a drawing of a powertrain according to the present invention.
FIG. 2 is a drawing of an accessory drive of the powertrain of FIG. 1.

With reference to FIGS. 1 and 2, the number 1 indicates a hybrid powertrain for a vehicle comprising an internal combustion engine 2 (below "the engine 2" for brevity) and an electrical machine 3 located in the vicinity of a front side 4 of the engine opposite the vehicle transmission (not illustrated).

On the front side 4 of the engine 2 an accessory drive 5 is arranged which comprises a first pulley 6 connected to a crankshaft 7 of the engine 2, having axis EA, a second pulley 8 connected to a shaft 9 of the electrical machine 3, having axis MA, and a belt 10 which connects the first pulley 6 and the second pulley 8 to each other. The accessory drive 5 can comprise other pulleys, not illustrated, for driving other accessories of the engine 1 such as, for example, a compressor of the conditioning system.

The accessory drive 5 further comprises a tensioner 14 mounted on the electrical machine 3, not illustrated in detail, for example of the type described in WO2018/211452 A.

The tensioner 14 comprises a pair of pulleys 15, 16 acting on respective branches 10a, 10b of the belt arranged on opposite sides of the electrical machine 3.

The powertrain 1 lastly comprises a control unit 17 designed to control the engine 2 and the electrical machine 3 as a function of a plurality of input signals S representative of the torque request and the vehicle driving conditions, according to a program described below.

Figures 3, 4:
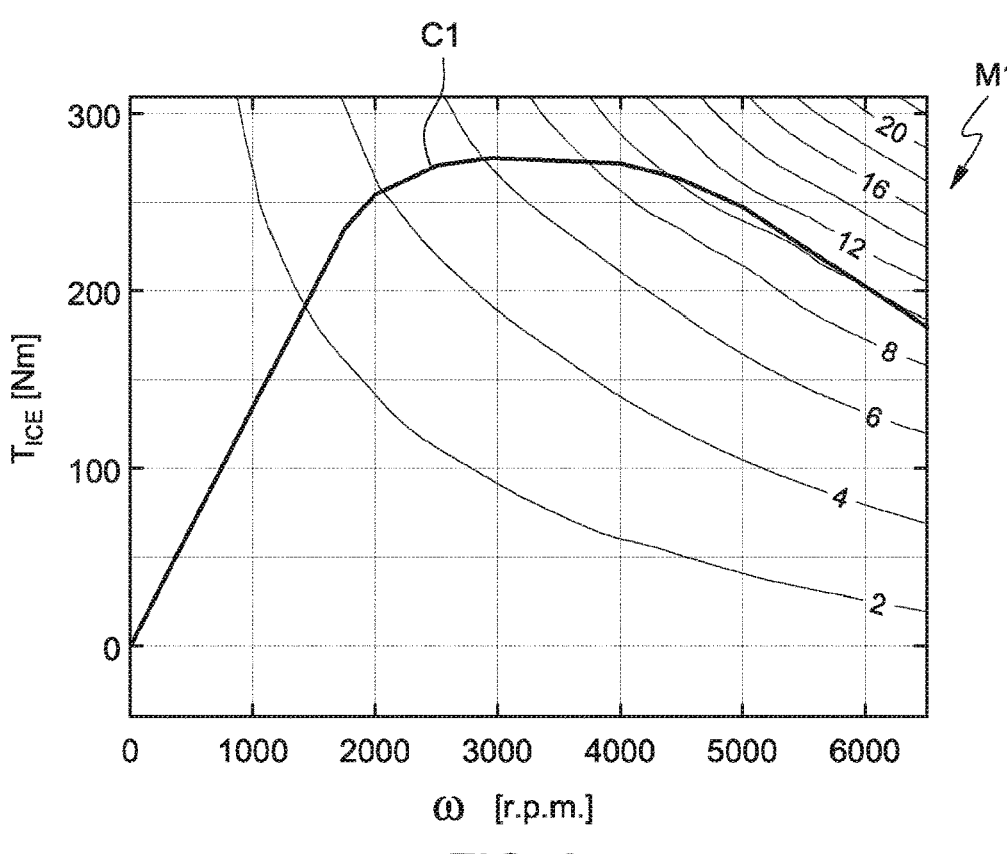
FIG. 3 illustrates a map of an internal combustion engine of the powertrain of FIG. 1.
FIG. 4 illustrates a map of an electrical machine of the powertrain of FIG. 1.

FIG. 3 illustrates an operating map M1 of the engine 2, showing on the X axis the angular speed ω [r.p.m.] of the crankshaft and on the Y axis the torque $T_{ICE}$ [Nm]. C1 indicates the characteristic curve of the engine 2, which identifies the maximum torque available for each speed value.

FIG. 4 illustrates an operating map M2 of the electrical machine 3, showing on the X axis the angular speed of the electric motor [r.p.m.] and on the Y axis the torque $T_{EM}$ [Nm].

In particular, C2 and C3 indicate the characteristic curves of the electrical machine 3, which represent the maximum torque available in the boost condition (upper quadrant) and in the recovery condition (lower quadrant).

Figures 5, 6:
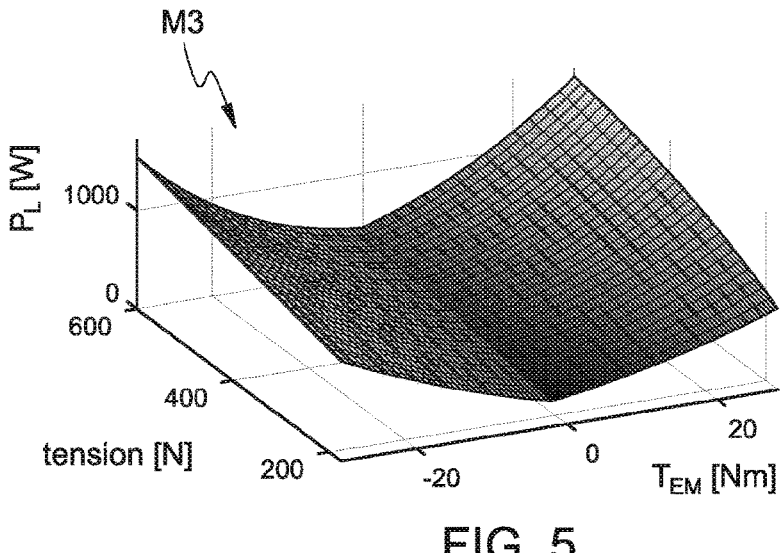
FIG. 5 illustrates a map of the accessory drive of the powertrain of FIG. 1.
FIG. 6 is a flow chart of a control program of the powertrain which implements the control method of the present invention.

Lastly, FIG. 5 illustrates a map M3 of efficiency of the accessory drive 5. The map M3 is three-dimensional and shows the power losses $P_L$ [W] as a function of the tension of the belt 10 and the torque $T_{EM}$ at the electrical machine 3. These losses can be determined experimentally. It can be easily seen that the losses increase with increase in the absolute value of the torque as the belt preload increases.

Alternatively to the map M3, in which the power losses are determined experimentally and stored, a mathematical model can be used in which the losses are calculated instant by instant as a function of the torque [Nm] at the electrical machine 3, once the preload of the belt (10) is known.

FIG. 6 illustrates a flow chart of the control program of the control unit 17 designed to implement the control method of the powertrain 1 according to the present invention.

Starting from an initialization block 20, the program goes to the block 21 for loading the maps M1, M2 and M3.

From block 21 the program then goes to a block 22 for acquisition of the input data from on-board sensors, which consist of:

requested torque $T_{REQ}$
angular speed ω of the crankshaft
state of charge SOC of the vehicle battery
desired state of charge The program then reaches a block 23 in which it verifies whether the requested torque $T_{REQ}$ is positive (namely, is a traction torque). If so, the program activates a boost function 24 described in further detail below; if not, the program activates a recuperation function 25, in which the mechanical power available to the electrical machine is converted into electrical power for recharging the battery.

The program then goes on to a block 26 for verifying switch-off of the powertrain. If not switched off, the program returns to block 22. If switched off, it goes to end of cycle 2.

Figure 7:
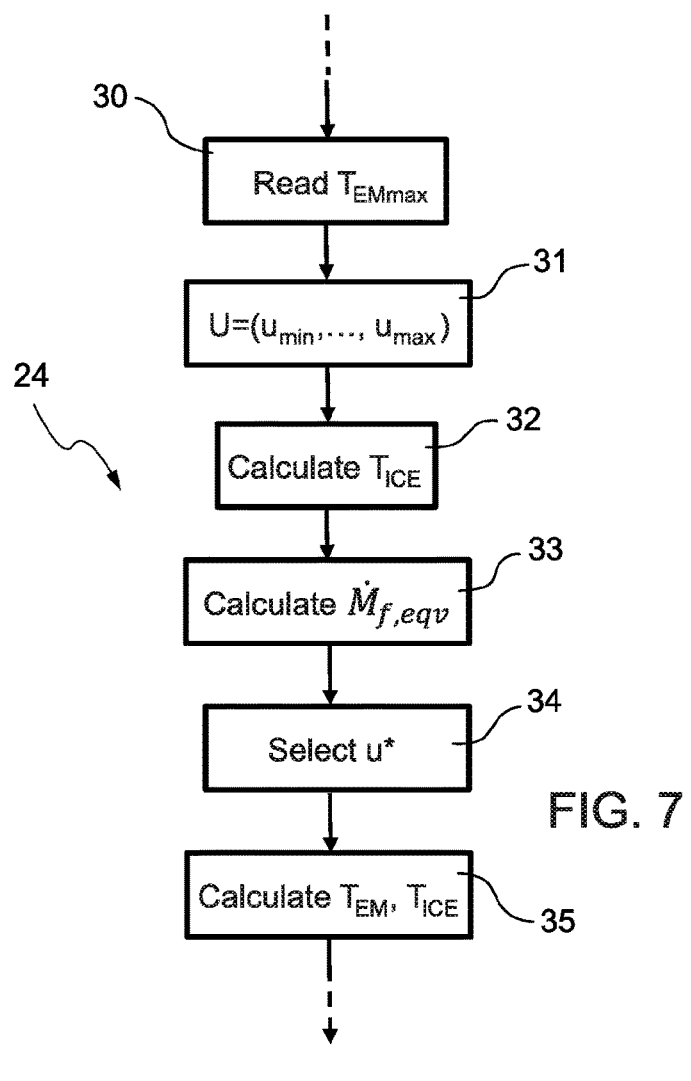
FIG. 7 is a flow chart of a function of the program of FIG. 6.

FIG. 7 illustrates a flow chart of the boost function.

From the system input data, as said, the requested torque $T_{REQ}$ and the angular speed ω of the engine are known.

In a first block 30, the maximum torque $T_{EMmax}$ available to the electrical machine 3 for the boost is read from the map M2.

In a successive block 31, the range of the torques available to the electrical machine 3 is discretized in a finite number of values creating a vector $U=[u_{min}, \ldots, u_{max}]$ the components u of which represent possible relations between a torque value $T_{EM}$ available to the electrical machine 3, between 0 and $T_{EMmax}$, and the requested torque $T_{REQ}$:

$$u = \frac{T_{EM}}{T_{REQ}} \tag{1}$$

By way of example, in FIG. 4 reading of the maximum torque $T_{EMmax}$ is illustrated, entering the map at the speed $\omega_0$.

The torque range $0$-$T_{EMmax}$ is split into a pre-set number of discrete values $T_{EMmin}, \ldots T_{EMmax}$ where $T_{EMmin}=u_{min} \cdot T_{REQ}$ (equal to 0 in the example described) and $T_{EMmax}=u_{max} \cdot T_{REQ}$.

In a successive block 32, for each value of u the corresponding value of the torque at the engine 2 is calculated $$T_{ICE}=T_{REQ}-T_{EM} \tag{2}$$

In a successive block 33, for each of the values $u_{min}, \ldots, u_{max}$ the equivalent consumption is calculated $$\dot{m}_{f,eqv}(t)=\dot{m}_f(t)+\dot{m}_{ress}(t) \; [g/s] \tag{3}$$

wherein $$\dot{m}_f(t) = \frac{P_{eng}(t)}{\eta_{eng}(t)Q_{lhv}} \; [g/s] \tag{4}$$

is the actual fuel consumption by the engine 2, $P_{eng}(t)$ [W] is the power of the engine 2 (calculated from the torque $T_{ICE}$ and from the angular speed ω of the crankshaft), $\eta_{eng(t)}$ [−] is the efficiency of the engine 2, available from the map M1, $Q_{lhv}$ is the energy content of the fuel per unit of mass; and wherein $$\dot{m}_{EM}(t) = sfc_{eq}(t) \cdot P_{EM}(t) = \frac{s}{Q_{lhv}} \frac{P_{EM}(t)}{\eta_{EM}(t) \cdot \eta_{FEAD}(t)} \; [g/s] \tag{5}$$

is the virtual fuel consumption by the electrical machine 3, $P_{EM}(t)$ [W] is the power of the electrical machine 3, calculated on the basis of the torque $T_{EM}$ and the angular speed $\omega_{EM}$ of the electrical machine 3, $sfc_{eq}(t)$ [g/Wh] is the virtual specific consumption (namely the fuel consumption equivalent to the unitary consumption of electrical energy),

5

$\eta_{EM}(t)$ is the efficiency of the electrical machine 3, $\eta_{FEAD}(t)$ is the efficiency of the transmission 5, and s is an a dimensional equivalence factor which allows the virtual fuel consumption to be expressed as a function of the power of the electrical machine 3 and the energy content of the fuel, by analogy with [4]. In short, it is a factor that assigns a cost to the use of the electrical energy, converting the use thereof into an equivalent fuel consumption; determination of the latter will be discussed below.

The program then reaches a block 33 in which the value u* is selected to which the minimum value $\dot{m}_{f,eqv}$ corresponds.

Lastly, the program reaches a block 34 in which the torques $T_{EM}=u^*\cdot T_{REQ}$ and $T_{ICE}=T_{REQ}-T_{EM}$ are calculated which must be delivered by the electrical machine 3 and by the engine 2 respectively.

In the known applications, s is generally assigned a constant value. This value is chosen so as to respect the conflicting requirements of maximum exploitation of the electric motor energy potential and maintain the battery charge state.

In particular, if s(t) is too high, an excessive cost is attributed to the use of the electrical energy and therefore the electrical machine is not exploited to its full potential. If s(t) is too low, on the other hand, the opposite occurs: the battery runs down too rapidly and the recharge sustainability is lost.

A constant value can be estimated on the basis of a reference guide cycle (for example WLTP, Artemis Urban, etc.); the ECMS will therefore be all the more accurate the more the real guide cycles are similar to the reference guide cycle.

However, s depends intrinsically on the vehicle operating conditions and is therefore more correctly indicated as s(t).

Since in a non-plug-in vehicle the desired charge value at the end of the cycle ($S_{target}$) is equal to the charge value at the beginning of the cycle, with the speed and requested torque values being equal, it is expedient for the strategy to operate differently according to the charge level (SOC) of the battery.

For this purpose, according to a preferred embodiment of the present invention, s(t) can be expressed as:

$$s(t)=s_0 \cdot p(SOC) \qquad [6]$$

in which $$p(SOC) = 1 - \left( \frac{SOC(t) - SOC_{target}}{(SOC_{max} - SOC_{min})/2} \right)^a \qquad [7]$$

constitutes a penalty factor which increases the cost of the electrical energy in the vicinity of a low battery charge (SOC near to $SOC_{min}$), and reduces the cost of the electrical energy in the vicinity of a high battery charge (SOC near to $SOC_{max}$).

The exponent can assume integer values 1, 2, . . . n, thus obtaining a linear trend of the penalty (a=1), or hyperbolic trends increasingly accentuated as the exponent grows.

Figure 8:
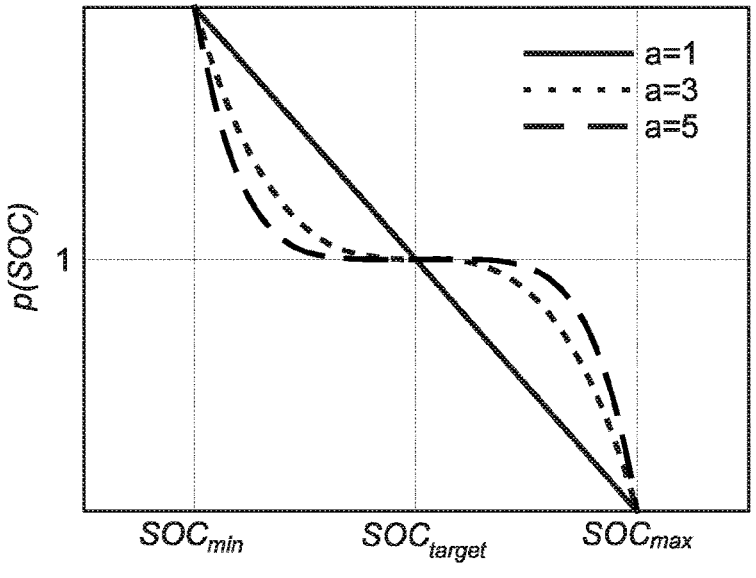
FIG. 8 is a graph showing a penalty factor used in the method of the invention.

FIG. 8 illustrates the curves with a=1, a=3, a=5.

It follows that in the first case, [6] produces a high value of s(t), and therefore a high value of $\dot{m}_{f,eqv}$ calculated with [3], thus reducing the probability that this value is selected by the program. On the contrary, in the second case, [6] produces a low value of s(t), and therefore of $\dot{m}_{f,eqv}$, thus increasing the probability that said value is selected by the program. In other words, the strategy will tend to favour electrical traction at high battery charge levels and thermal traction at low battery charge levels. The higher the exponent a, the more this correction is limited to the extremes of the range $SOC_{min}-SOC_{max}$, as can be seen from FIG. 8.

From an examination of the characteristics of the present invention, the advantages it offers are evident.

In particular, the use of a map or a mathematical model of the transmission efficiency allows this parameter to be taken into account in a dynamic manner, during the control, and therefore distribution of the torque between the engine and the electrical machine to be optimized.

This results in a reduction in consumption and emissions.

Lastly, it is clear that modifications and variations can be made to the method described that do not depart from the scope defined by the claims.

For example, the control strategy can be based on different logics, for example fuzzy or other types, provided they are based on the acquisition of data that take account of the transmission efficiency. For example, in the case of fuzzy logic, membership functions can be defined that take account of the transmission efficiency.

The transmission 5 can be a chain transmission instead of a belt transmission.

The electrical machine 3 can be arranged downstream of the internal combustion engine (2), namely in position P2, instead of forming part of the accessory drive 5.

The invention claimed is:

1. A method for controlling a hybrid powertrain for a vehicle comprising an internal combustion engine, an electrical machine connected to a crankshaft of the internal combustion engine via a transmission including a belt, a battery, and a control unit, the method comprising:

acquiring first data comprising data representative of an efficiency of the internal combustion engine (M1), representative of an efficiency of the electrical machine (M2), and representative of an efficiency of the transmission (M3), acquiring second data representative of vehicle operating conditions, processing, by the control unit, the first and second data, wherein said processing comprises calculating a distribution of torque between the internal combustion engine and the electrical machine, and controlling said engine and said electrical machine based on the calculated distribution of torque;

wherein the data representative of the efficiency of the transmission is extracted from a map stored in the control unit, and the map represents the transmission efficiency as a function of the torque of the electrical machine and of a tension of the belt.

2. The method as claimed in claim 1, wherein the processing operates according to a strategy of minimizing the equivalent instantaneous consumption defined by the actual fuel consumption of the internal combustion engine and by the equivalent fuel consumption corresponding to the electrical machine power.

3. The method as claimed in claim 1, wherein controlling comprises activating a boost function or a recuperation function of the electric machine.

4. The method of claim 3, wherein, when a requested torque value is positive, the boost function is activated and, when the requested torque is negative, the recuperation function is activated; wherein the recuperation function instructs the system to convert mechanical power available to the electric machine into electrical power to recharge a battery.

5. A method for controlling a hybrid powertrain for a vehicle comprising an internal combustion engine, an electrical machine connected to a crankshaft of the internal combustion engine via a transmission, and a control unit, the method comprising:

acquiring first data comprising data representative of an efficiency of the internal combustion engine (M1), representative of an efficiency of the electrical machine (M2), and representative of an efficiency of the transmission (M3), acquiring second data representative of vehicle operating conditions, processing, by the control unit, the first and second data, and controlling said engine and said electrical machine based on the calculated distribution of torque;

wherein processing comprises calculating a distribution of torque between the internal combustion engine and the electrical machine and operates according to a strategy of minimizing the equivalent instantaneous consumption defined by the actual fuel consumption of the internal combustion engine and by the equivalent fuel consumption corresponding to the electrical machine power and the equivalent instantaneous consumption is calculated for a plurality of discrete torque values deliverable by the electrical machine at the angular speed and the corresponding torque delivered by the internal combustion engine.

6. The method as claimed in claim 5, wherein the equivalent consumption is calculated based on a variable equivalence factor.

7. The method as claimed in claim 6, wherein the variable equivalence factor contains a penalty factor (p(SOC)) dependent on battery charge level.

8. The method as claimed in claim 7, wherein the penalty factor is defined by the relation:

$$p(SOC) = 1 - \left( \frac{SOC(t) - SOC_{target}}{(SOC_{max} - SOC_{min})/2} \right)^a$$

wherein p(SOC) is the penalty factor, SOC(t) is the instantaneous battery charge, $SOC_{target}$ is the desired charge at the end of the cycle, $SOC_{min}$ and $SOC_{max}$ are the minimum and maximum battery charge.

9. A hybrid powertrain for a vehicle comprising an internal combustion engine, an electrical machine to a crankshaft of the internal combustion engine via a belt transmission and a control unit, the control unit configured for:

acquiring first data comprising data representative of an efficiency of the internal combustion engine (M1), representative of an efficiency of the electrical machine (M2), and representative of an efficiency of the belt transmission (M3), acquiring second data representative of vehicle operating conditions, processing the first and second data, wherein said processing comprises calculating a distribution of torque between the internal combustion engine and the electrical machine, and controlling the internal combustion engine and the electrical machine based on said calculated distribution of torque.

10. The hybrid powertrain as claimed in claim 9, wherein the transmission is an accessory drive.

11. The hybrid powertrain as claimed in claim 9, wherein the electrical machine is in a position downstream of the internal combustion engine.

12. The hybrid powertrain as claimed in claim 9, wherein the data representative of the efficiency of the belt transmission is calculated using a mathematical model.

13. The hybrid powertrain as claimed in claim 9, wherein the data representative of the efficiency of the belt transmission is extracted from a map stored in the control unit.

* * * * *